No. 881,545. PATENTED MAR. 10, 1908.
J. E. & A. W. CAPS.
POWER TRANSMISSION MEANS.
APPLICATION FILED JAN. 25, 1907.

4 SHEETS—SHEET 1.

WITNESSES:

INVENTORS:
John E. Caps
Arthur W. Caps
BY
ATTORNEY

No. 881,545. PATENTED MAR. 10, 1908.
J. E. & A. W. CAPS.
POWER TRANSMISSION MEANS.
APPLICATION FILED JAN. 25, 1907.

4 SHEETS—SHEET 2.

WITNESSES:
INVENTORS:
John E. Caps. Arthur W. Caps
BY
ATTORNEY

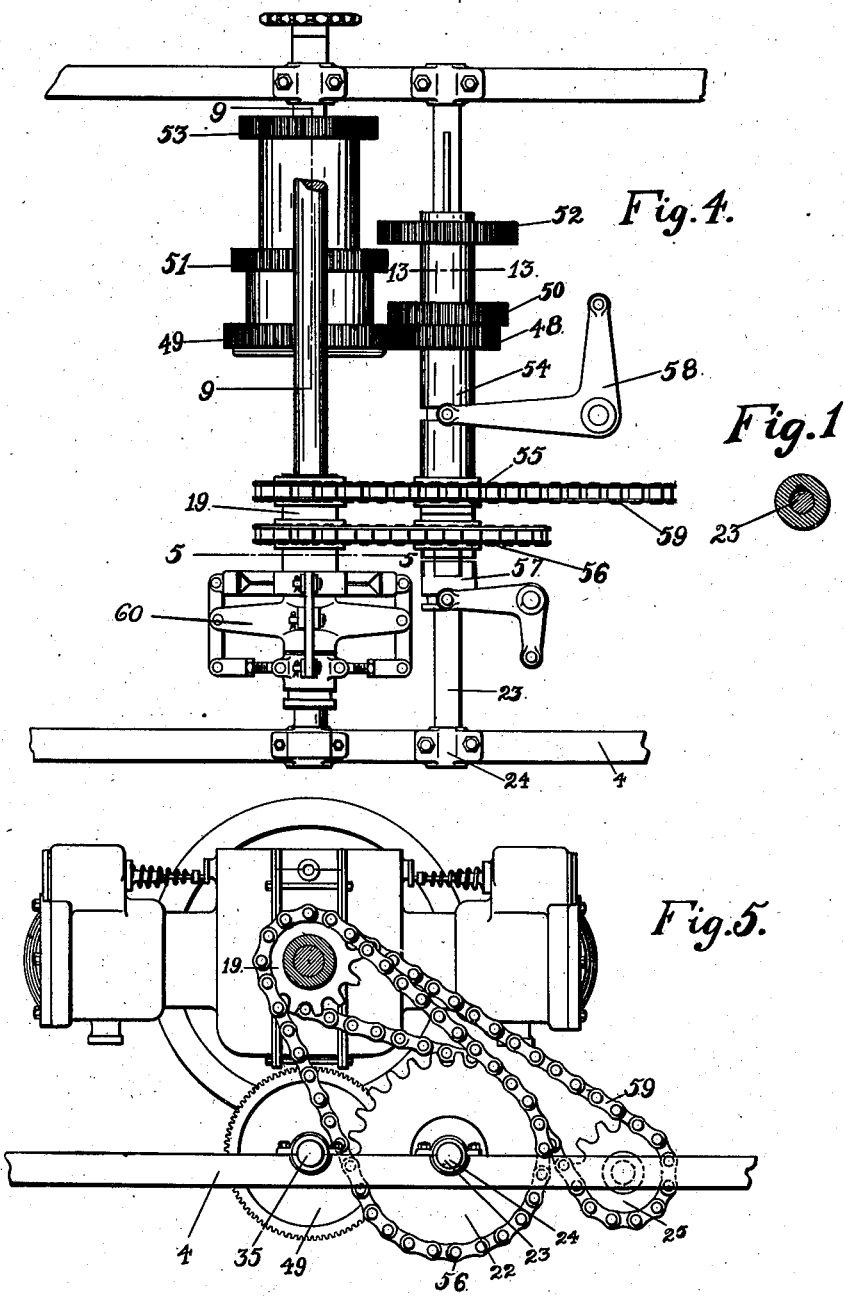

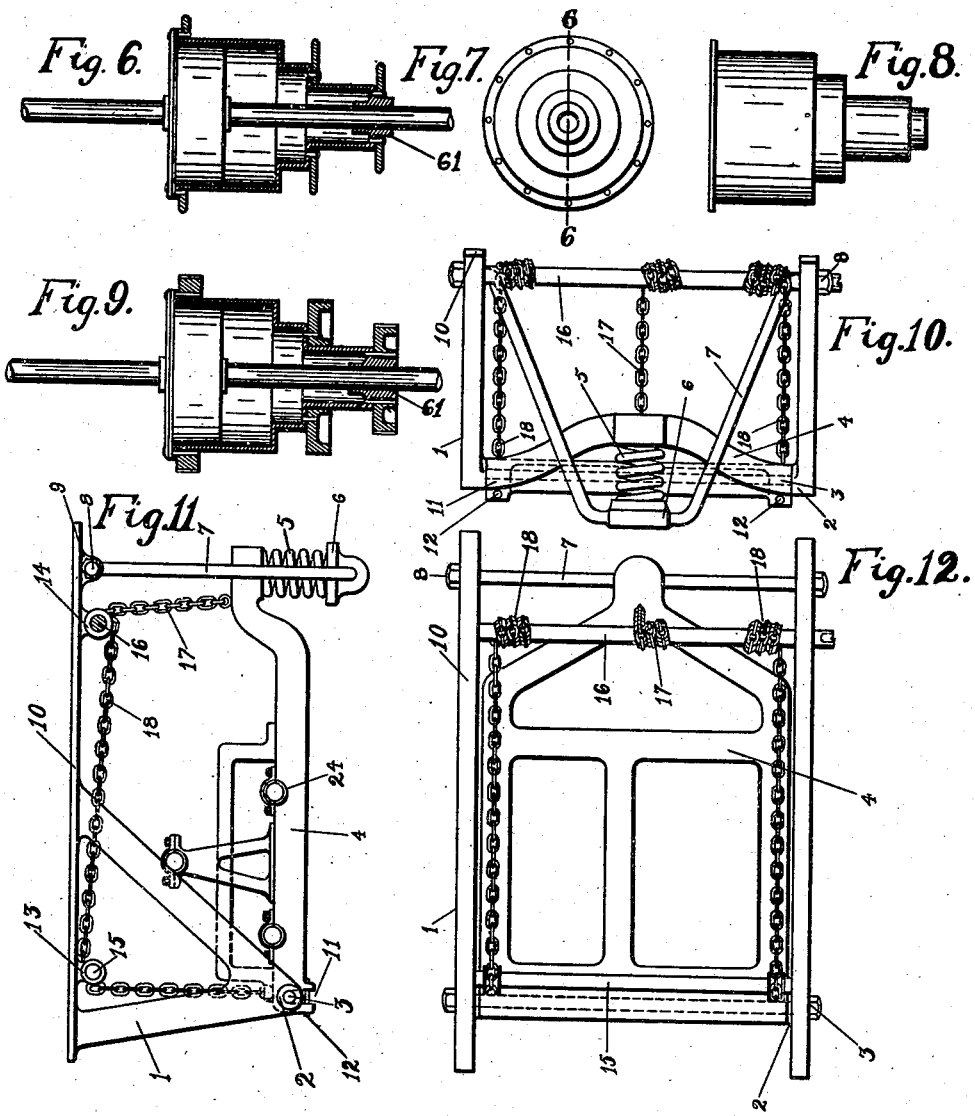

UNITED STATES PATENT OFFICE.

JOHN E. CAPS AND ARTHUR W. CAPS, OF KANSAS CITY, MISSOURI.

POWER-TRANSMISSION MEANS.

No. 881,545.            Specification of Letters Patent.        Patented March 10, 1908.

Application filed January 25, 1907. Serial No. 353,983.

*To all whom it may concern:*

Be it known that we, JOHN E. CAPS and ARTHUR W. CAPS, citizens of the United States, residing at Kansas City, in the county of Jackson and State of Missouri, have invented certain new and useful Improvements in Power-Transmission Means; and we do hereby declare the following to be a full, clear, and exact description of the invention, such as will enable others skilled in the art to which it appertains to make and use the same.

This invention relates to a novel construction in transmission gear for automobiles and in means for removably hanging the motor and transmission gear on the automobile body in such manner as to enable the same to be easily lowered to render the same accessible for purposes of repair and to render the same easily removable for the substitution of a new motor and drive gear in the event that one thereof shall give out.

The object of the invention is to provide simple and efficient variable speed and reversing gear and simple and efficient means for hanging the motor and such gear to the automobile body and consists in the features of construction and combinations of parts hereinafter fully described and claimed.

Figure 1:
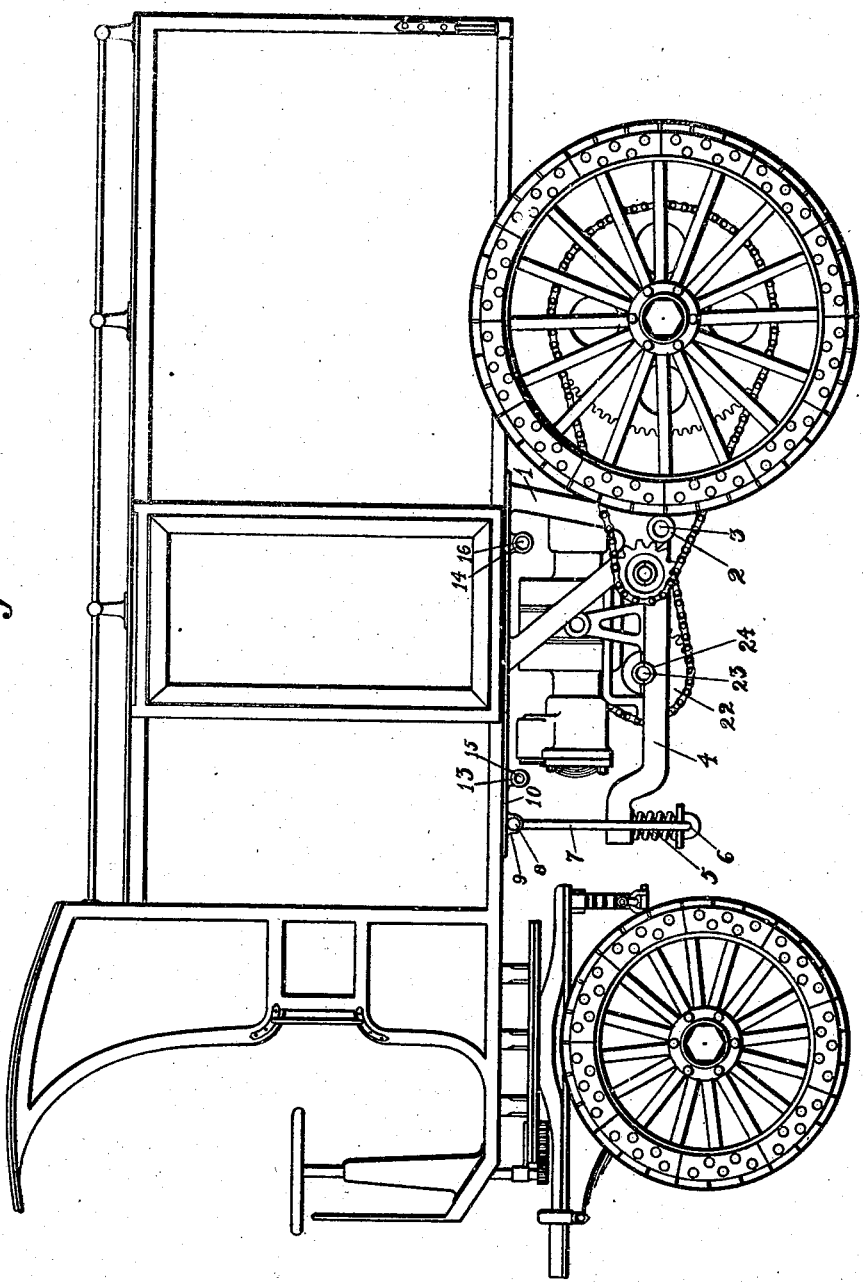
Figure 2:
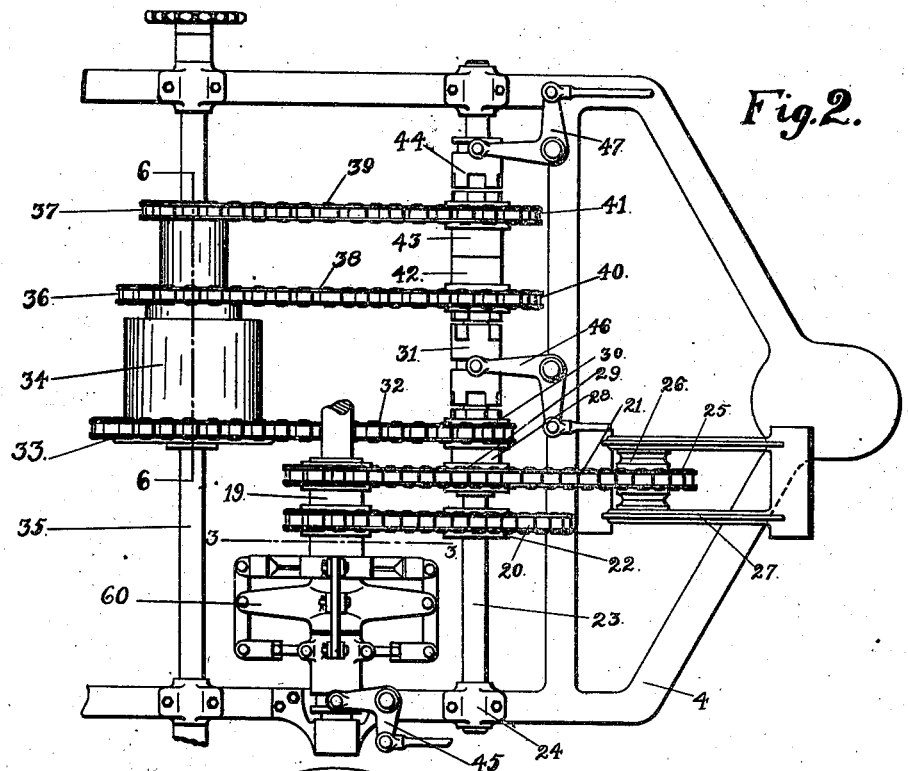
Figure 3:
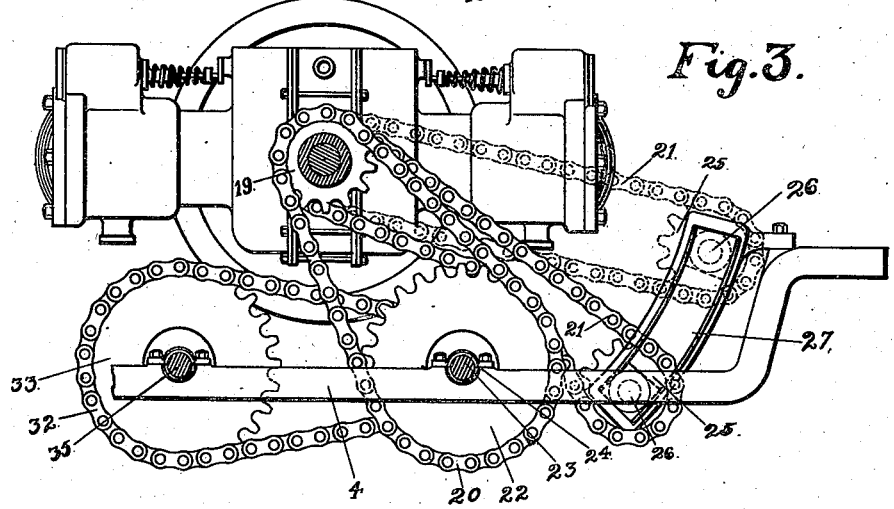

In the accompanying drawings illustrating this invention Figure 1 is a view in side elevation of an automobile or motor truck provided with a supporting frame and drive gear constructed in accordance with this invention. Fig. 2 is a plan view on enlarged scale showing the transmission gear and part of the supporting frame, the motor being omitted. Fig. 3 is a side elevation of the motor and transmission gear and a part of the supporting frame, said view being partly in section on the line 3—3 of Fig. 2. Fig. 4 is a plan view of a modified form of construction of transmission gear in which spur gears are partially substituted for the sprocket chains shown in Figs. 2 and 3. Fig. 5 is a side view partly in side elevation and partly in section on the line 5—5 of Fig. 4. Fig. 6 is a central longitudinal section of the compensating gear drum employed taken on the line 6—6 of Figs. 2 and 7. Fig. 7 is an end elevation of the said drum, the sprockets being omitted. Fig. 8 is a side elevation of the same, the sprockets being omitted. Fig. 9 is a central longitudinal section of the compensating gear drum showing spur gears mounted thereon in place of sprocket wheels, taken on the line 9—9 of Fig. 4. Fig. 10 is an end elevation of the motor and transmission gear supporting frame showing the tackle for raising or lowering the same with relation to the automobile body. Fig. 11 is a side elevation of said supporting frame. Fig. 12 is a top plan view of the same. Fig. 13 is a detail section on the line 13—13 of Fig. 4.

Our invention has for its primary object to provide a variable speed and reversible transmission gear whch is practically noiseless, exceedingly simple in construction and very easily operable.

A further object of our invention is to provide variable speed transmission gear which occupies relatively very little space so as to render the same very compact and in providing for the support of such transmission gear, motor, etc., constituting the driving mechanism, a supporting frame which is removably mounted on the automobile body and which may be easily removed therefrom, together with all parts carried thereby, and interchanged, or which may be lowered at the end so as to render all the operating parts easy of access for purposes of cleansing or repair.

Referring now to said drawings, we provide on the automobile body a pair of parallel hangers 1 which are preferably substantially V-shaped and provided at their depending elbows with bearings 2, in which a shaft 3 is journaled. Supported at one end on said shaft 3 is a frame 4, on which the motor and transmission gear, etc., constituting the driving means for the vehicle, are supported, the other end of said frame being adapted to be supported upon a compression spring 5, seated upon a block 6, disposed upon the lower end of a V-shaped supporting hanger 7, which at the free ends of its arms is pivoted in bearings 8, in lugs 9, of the plates 10, secured to the bottom of the automobile body and carrying said hangers 1. The said end of said frame 4 supported on said shaft 3 is provided with inverted U-shaped recesses 11, in which said shaft 3 is adapted to be received and the mouths of said recesses are spanned by removable pins or bolts 12 to prevent said frame from springing off said shaft. Each of the said plates 10 is provided on its lower face adjacent its ends with lugs or projections 13 and 14 in each pair of which bearings are provided for shafts 15 and 16. The said shaft 16 serves as a windlass to which chains 17 and 18 are secured, said chains 17 being secured at its free end to said frame 4 at the free or spring supported end of the latter and said chains 18 being similarly secured to one end thereof, the other ends thereof being trained over said shaft 15 which serves as an idler and secured at said other ends to the other end of said frame 4. If, for example, it is desired to lower the free end of said frame 4, the said shaft 16 is turned so as to primarily raise said ends slightly to enable the hanger 7 and spring 5 supported thereby to be turned out of the path of the free end of said frame and by then reversing the movement of said shaft, said free end of said frame will obviously be lowered. During this movement the other end portions of said chains 18 connected with the other end of said frame 4 will become slack. If, however, it is desired to remove the entire frame 4 with the parts carried thereby, it will be necessary to first remove said pins or bolts 12 and then turn said shaft 16 in a direction to draw up on said chain 17 thereby obviously also pulling on the portions of the chains 18 trained over said shaft 15, thus raising the entire frame. After raising said frame a distance sufficient to throw the shaft 3 out of the recesses 11, the frame must be swung toward the hanger 11, so as to clear said shaft 3 and by then reversing the shaft 16, the frame will obviously be lowered.

The above described frame for hanging the motor and transmission gear is of advantage only in the event that such motor and transmission gear is very compact so that the entire driving mechanism can be confined in a small space.

As previously stated, the main object of our invention is to provide efficient variable speed and reversing gear for automobiles in the conception of which we had in mind the use of the hanging frame and to the use of which, it is particularly adapted besides being noiseless and simple and easily operable. The said driving gear comprises a friction clutch 60 of the toggle lever type rigidly mounted on the drive shaft and adapted to engage the disk at one end of a sleeve 19 loosely mounted on the motor shaft. On said sleeve 19 are rigidly disposed two sprocket pinions over which chains 20 and 21 respectively are trained said chain 20 being likewise trained over a sprocket 22 on the countershaft 23 journaled in bearings 24 on said frame 4. Said chain 21 is trained over an idler 25 journaled in bearings 26, which are movable in segmental guides 27 disposed eccentric to the motor shaft. Loosely mounted on said counter-shaft 23 is a sleeve 28, on which are rigidly disposed a sprocket wheel 29 and a sprocket pinion 30. The said sleeve 28 is adapted to be engaged by a sliding clutch member 31 rigid with said shaft 23 and adapted when the latter is thrown into engagment therewith to rotate with said shaft. A sprocket chain 32 is trained over the said sprocket pinion 30 and over a sprocket wheel 33 on the large end of a compensating gear drum 34 disposed on the jack shaft 35 which latter is adapted to be geared to the vehicle wheels in the usual manner. On said compensating gear drum are mounted two consecutively smaller sprocket wheels 36 and 37 over which chains 38 and 39 respectively are trained, the latter being likewise trained over sprocket wheels 40 and 41 respectively each of which is disposed on a sleeve 42 and 43 loosely mounted on said counter shaft 23. The said sleeve 42 is adapted to be engaged by said clutch member 31 to hold said sleeve rigid with said counter-shaft 23 and the sleeve 43 is adapted to be similarly engaged by clutch member 44 disposed on said counter-shaft 23 to hold said sleeve 43 rigid with said shaft. Said clutch members 31 and 44 and said clutch 60 are adapted to be actuated by means of independent levers disposed on the automobile body, but which are not shown and which are connected with said clutches through the intermediacy of bell crank levers 45, 46 and 47 respectively, pivotally mounted on said frame 4. The said sprocket chain 21 is normally maintained out of engagement with the sprocket wheel 29 as indicated in dotted lines in Fig. 3 and is thrown into engagement with said sprocket only when it is desired to reverse the vehicle. The said vehicle may be driven at three speeds forward, and one speed backwards, this being accomplished in the following manner: In starting the vehicle, the clutch 60 is thrown to hold the sleeve 19 rigid with the crank shaft of the motor and the counter shaft 23 is thus driven in a direction to propel the vehicle forward. By throwing the clutch member 31 to engage the sleeve 28 the pinion 30 is rotated, thus rotating the compensating gear drum at slowest speed. If said clutch 31 is thrown to engage the sleeve 42, the sprocket 40 is rotated and thereby the sprocket 36 through the intermediacy of the sprocket chain 38 is rotated thus propelling the vehicle forward at the second or medium speed. By throwing the clutch member 31 to a neutral position, that is, out of engagement with either of said sleeves 28 or 42 and throwing the clutch 44 into engagement with the sleeve 43, the sprocket wheel 41 is rotated and through the intermediacy of the sprocket chain 39, the sprocket 37 is rotated, thus propelling the vehicle forward at the maximum speed. If it is desired to reverse the vehicle, the clutch member 44 and clutch member 31 are both thrown out of engagement with either of said sleeves 43, 42 or 28, and the bearings 26 in which the shaft of the sprocket pinion 25 is journaled are moved downwardly by suitable means disposed on the automobile body and connected therewith (which said means are omitted from illustration as being superfluous) thus throwing said sprocket chain 21 into engagement with the sprocket wheel 29, thus rotating said sleeve 28 in a direction, the reverse of the direction of rotation of said counter-shaft 23, thus propelling the vehicle backwards at the slowest speed.

In operating the vehicle the chauffeur, in order to prevent any possible strain on the motor or drive gears, should throw said clutch 60 out before throwing in either of said clutches 31 or 44, or before throwing the sprocket chain 21 into engagement with the sprocket wheel 29, and after throwing the desired clutch or throwing said sprocket chain to rotate, either of said sleeves 28, 42 or 43, the clutch 60 should again be thrown in thus setting the proper sleeve in rotation and permitting the same to be started relatively slowly by reason of the action of the friction clutch 60, which obviously will, if properly adjusted, slip in the event that the strain thereon becomes too great. By means of our said gearing it will be possible practically to produce an almost noiseless gear and which furthermore is so simple, efficient and easily accessible, as to greatly reduce the probable repairs necessary and render the parts easily accessible for purposes of repair and cleansing when required.

In Figs. 4 and 5 we have shown a modified form of construction, in which spur gears 48, 49, 50, 51, 52 and 53 are substituted for the sprockets 30 and 33 and the sprocket chain 32 and said remaining sprockets and sprocket chains 40, 36, 37, 41, 38 and 39 respectively. All of said spur gears 48, 50 and 52 are rigidly mounted on a sleeve 54 keyed on the counter-shaft 23 and longitudinally movable thereon. Said sleeve 54 also carries a sprocket 55 corresponding to the sprocket 29 shown in Fig. 2. A sprocket wheel 56 is loosely disposed on said shaft 23 and is adapted to be clutched to rotate with said shaft by means of a clutch member 57 on said shaft, adapted to co-act with one end of the hub of said sprocket 56. Said sleeve 54 is adapted to be moved longitudinally by means of a bell crank lever 58 to throw said gears 48, 50 and 52 into mesh with the gears 49, 51 and 53 on the compensating gear drum respectively, said gears being relatively so arranged that when said gear 48 is in mesh with the gear 49, the gears 50 and 52 are out of mesh with the gears 51 and 53 and vice versa when the gear 50 meshes with the gear 51, the gears 48 and 52 are out of mesh with the gears 49 and 53. The said sprocket 55 is adapted to be engaged by the sprocket chain 59 which corresponds exactly with the sprocket chain 21 shown in Fig. 2, though illustration of the movable idler over which said chain is trained is omitted as being superfluous. When the spur gear 48 meshes with the spur gear 49 as shown in Fig. 4, said sprocket 55 will be disposed in the path of said chain 59 and adapted to be engaged thereby to rotate said sleeve to reverse the vehicle, the clutch 57 being at this time thrown out and the sprocket 56 running loosely thereon in a direction reverse of the movement of said shaft 23, when said chain 59 engages said sprocket 55.

In the remaining details of construction, the matter shown in Figs. 4 and 5 is identical with the matter shown in Figs. 2 and 3. By disposing the guide 27 eccentric to the drive shaft so that, as shown, the lower end is disposed nearer said shaft than the upper end thereof, the chain 21 when lowered will become slack. Such slack, however, will be taken up by the sprocket 29 and said chain will thus engage a larger number of the teeth of said sprocket than if maintained taut when lowered. This is obviously very advantageous as it will prevent slippage of the chain.

For the sprockets and sprocket chains employed other equivalent transmission means may be substituted without departing from the spirit of this invention.

The compensating gear employed is of ordinary construction, the shaft 35 consisting of two relatively rotatable parts coupled by means of such gear, the latter being inclosed in said drum 34 which, as usual is loose with relation to both parts of said shaft 35 and carries the idle gear pinions by means of which the opposing ends of said shaft are geared to each other, this construction being well-known and requiring no special illustration or description. By extending and stepping this drum as shown and mounting the sprockets or gears of varying diameters thereon and providing a bearing 61 at the smaller end of said drum in which the last-named part of said shaft 35 is journaled between its ends, we are enabled to gear the countershaft 23 directly to the said jack-shaft 35 to drive the latter at variable speed without interposing another countershaft between said shaft 23 and said shaft 35 which would otherwise be necessary. This is very important in reducing the number of parts and constitutes an essential feature of this invention. Attention is also particularly directed to the fact that the clutch 60 is rigid with the motor shaft and frictionally engages the sleeve 19 to hold the latter against rotation relatively thereto. Consequently the transmission gear carries no heavy part adapted to act as a balance wheel, but runs very light so that it can be easily stopped and reversed without danger of stripping a gear or breaking a chain. This, so far as I am informed, is entirely novel and constitutes an important feature of the invention.

We claim as our invention:

1. In an automobile, a drive gear comprising a frame a drive shaft a sleeve loosely mounted thereon, a clutch adapted to hold said shaft and sleeve against relative rotation, a pair of sprockets rigidly mounted on said sleeve, a countershaft, a sprocket rigid therewith and geared to one of said sprockets on said sleeve, a sleeve loosely mounted on said countershaft, a plurality of sprockets carried thereby a jack-shaft, a sprocket carried thereby, to which one of said sprockets on said sleeve is adapted to be geared, an idler disposed in bearings movable on the frame, a sprocket-chain trained over said idler and over one of said sprockets of said first-named sleeve, one of said sprockets of said last-named sleeve being disposed in the path of and adapted to be engaged by said chain when said idler is moved in one direction and a clutch disposed on said countershaft and adapted to engage said sleeve thereon to hold same against rotation relatively to said shaft.

2. Reversing gear for automobiles, comprising a drive-shaft, a driven shaft and an intermediate countershaft, a sleeve loosely mounted on said drive-shaft, clutching means disposed in operative relation to said drive-shaft and said sleeve and adapted to hold the same against relative rotation, a plurality of sprockets rigidly disposed on said sleeve, an idler disposed in bearings movable in guides eccentric to said drive shaft, a sprocket chain geared over said idler and one of the said sprockets on said sleeve, a sprocket rigid with said countershaft and geared to one of said sprockets on said sleeve, a sleeve loosely mounted on said countershaft and geared to said driven shaft, a sprocket disposed on said last named sleeve in the path of said idler chain and adapted when said idler is moved in one direction to be engaged by said chain and clutching means disposed in operative relation to the gearing between said countershaft and said driven shaft to throw the latter out of relative gear and enable said driven shaft to be reversed without reversing said countershaft.

3. Power transmission means comprising in combination, a drive-shaft, a driven shaft, an intermediate countershaft, a pair of sprockets on said drive shaft, a sprocket on said countershaft geared to one of said sprockets on said drive-shaft, an idler geared to said other sprocket on said drive-shaft, a sprocket on said countershaft adapted to be interposed in said gearing between said idler and said drive-shaft, variable speed gearing between said countershaft and said driven shaft and clutches disposed in operative relation to said countershaft and gear members carried thereby.

4. Power transmission means comprising a drive-shaft revoluble in one direction, a countershaft, a pair of sprockets disposed on said drive-shaft, a pair of sprockets disposed on said countershaft, one of the latter being normally loose thereon, a sprocket chain trained over one of said sprockets of each of said shafts, an idler disposed in movable bearings, a sprocket chain trained over said idler and said other sprocket on said drive shaft, said last-named sprocket chain being adapted to be thrown into engagement with said other sprocket on said countershaft, a clutch disposed in operative relation to said countershaft and said loose-sprocket thereon to hold the same against relative rotation, a sleeve on said countershaft a part to be driven and gearing between the same and said sleeve, said clutch and said idler chain determining the direction of rotation of said sleeve.

5. Power transmission means comprising a frame a drive-shaft revoluble in one direction, a pair of sprockets adapted to rotate therewith, a countershaft, a sprocket rotatably rigid therewith, a sprocket loosely mounted thereon, an idler disposed on the frame, sprocket chains trained over one of said sprockets on said drive-shaft and said countershaft, a sprocket-chain trained over said idler and over said other sprocket on said drive-shaft, means for imparting relative movement to said last-named chain and said other sprocket on said countershaft to throw the same into engagement with each other, and a clutch disposed in operative relation to said countershaft and said loose sprocket thereon to hold the same against relative rotation.

6. Power transmission means comprising a frame a drive-shaft revoluble in one direction, a pair of sprockets normally loose thereon, a clutch adapted to hold said sprockets against rotation relatively thereto, a countershaft, a sprocket rotatably rigid therewith, a sprocket loosely mounted thereon, an idler disposed on the frame, sprocket chains trained over one of said sprockets on said drive-shaft and said countershaft, a sprocket-chain trained over said idler and over said other sprocket on said drive-shaft, means for imparting relative movement to said last-named chain and said other sprocket on said counter-shaft to throw the same into engagement with each other, and a clutch disposed in operative relation to said countershaft and said loose sprocket thereon to hold the same against relative rotation.

7. Power transmission means comprising a frame a drive-shaft revoluble in one direction, a pair of sprockets adapted to rotate therewith, a countershaft, a sprocket rotatably rigid therewith, a sprocket loosely mounted thereon, an idler disposed on the frame, sprocket chains trained over one of said sprockets on said drive-shaft and said countershaft, a sprocket-chain trained over said idler and over said other sprocket on said drive-shaft, means for imparting relative movement to said last-named chain and said other sprocket on said countershaft to throw the same into engagement with each other, a sleeve on said countershaft normally rigid with one of said sprockets thereon, a part to be driven, gearing between the same and said sleeve, and a clutch disposed in operative relation to the said sleeve and said other sprocket on said countershaft to hold the same against relative rotation.

8. Power transmission means comprising a frame a drive-shaft revoluble in one direction, a pair of sprockets normally loose thereon, a clutch adapted to hold said sprockets against rotation relatively thereto, a countershaft, a sprocket rotatably rigid therewith, a sprocket loosely mounted thereon, an idler disposed on the frame, sprocket chains trained over one of said sprockets on said drive-shaft and said countershaft, a sprocket-chain trained over said idler and over said other sprocket on said drive-shaft, means for imparting relative movement to said last-named chain and said other sprocket on said countershaft to throw the same into engagement with each other, a sleeve on said countershaft rigid with one of said sprockets thereon, a part to be driven, gearing between the same and said sleeve, and a clutch disposed in operative relation to the said sleeve and said other sprocket on said countershaft to hold the same against relative rotation.

9. In variable speed gearing, a driven shaft comprising two parts, compensating gears disposed between the said parts, a drum inclosing said compensating gears and overhanging one part of said shaft, the latter being journaled therein, a plurality of gear members of varying diameters disposed on said drum, a power actuated shaft, a plurality of gear members disposed thereon adapted to be geared to said gear members of said drum to rotate the latter at variable speeds relatively to said power actuated shaft, and means disposed in operative relation to said gear members and said power actuated shaft to throw any pair of said gear members into operation to the exclusion of the remainder.

10. In reversible gearing, a power actuated shaft, a pair of sprockets adapted to rotate therewith, a countershaft, a sprocket rotatably rigid therewith, a sprocket loosely disposed thereon, a sprocket chain trained over one of said sprockets of each of said shafts, segmental guides eccentric to said power actuated shaft, idler supporting means movably disposed in said bearings, an idler carried thereby, a sprocket chain trained over said idler and said other sprocket on said power actuated shaft and adapted when moved in one direction to become slack and engage said other sprocket on said countershaft, the latter being adapted to take up said slack, a member to be driven, gearing between the latter and said countershaft, and means disposed in operative relation to said gearing and said loose sprocket on said countershaft to throw the latter into operative engagement to rotate the same.

11. In reversible speed gearing, a drive-shaft, a countershaft, a driven shaft, a pair of sprockets on the drive shaft adapted to revolve therewith, a sprocket rotatably rigid with said countershaft, a sprocket loosely mounted thereon, a clutch for holding said loose sprocket rigid with said countershaft, gearing between the latter and said driven shaft, a sprocket chain trained over one each of said sprockets on said drive and countershafts, segmental guides disposed eccentric to said drive shaft, idler supporting means movably disposed in said guides, an idler carried thereby, a sprocket-chain trained over the latter and said other sprocket on said drive-shaft and adapted when moved in one direction to become slack and engage said other sprocket on said countershaft, the latter taking up such slack and being revolved in a direction opposite to the direction of rotation of said other sprocket on said countershaft, and operable connection between said sprocket and said gearing to reverse said driven shaft.

In testimony whereof, we have signed our names in the presence of two subscribing witnesses.

JOHN E. CAPS.
ARTHUR W. CAPS.

Witnesses:
RUDOLPH WM. LOTZ,
ARTHUR A. LOTZ.